(12) United States Patent
Dillat et al.

(10) Patent No.: US 6,284,972 B1
(45) Date of Patent: Sep. 4, 2001

(54) SPLITTER BOX

(75) Inventors: Michel L. Dillat, Courbevoie; Pierre J. Bouvier, Rosny-Sous-Bois, both of (FR)

(73) Assignee: Proptic, Rosny-Sous-Bois (FR)

( * ) Notice: Subject to any disclaimer, the term of this patent is extended or adjusted under 35 U.S.C. 154(b) by 0 days.

(21) Appl. No.: 09/462,123

(22) PCT Filed: Jun. 23, 1998

(86) PCT No.: PCT/FR98/01310

§ 371 Date: Mar. 9, 2000

§ 102(e) Date: Mar. 9, 2000

(87) PCT Pub. No.: WO98/59502

PCT Pub. Date: Dec. 30, 1998

(30) Foreign Application Priority Data

Jun. 24, 1997 (FR) .................................... 97 07842

(51) Int. Cl.⁷ .................................... H01R 13/46
(52) U.S. Cl. ................ 174/60; 174/41; 174/59; 174/135; 439/507; 361/823
(58) Field of Search .............. 174/60, 41, 72 R, 174/59, 44, 135; 361/823, 827; 439/507, 571

(56) References Cited

U.S. PATENT DOCUMENTS

| | | | |
|---|---|---|---|
| 547,078 | * 10/1895 | Johnson | 220/3.8 X |
| 586,464 | * 7/1897 | Tobey | 174/60 |
| 1,639,310 | * 8/1927 | Richardson | 174/60 |
| 3,147,337 | * 9/1964 | Chennell | 174/72 R |
| 3,708,628 | 1/1973 | Hendriks . | |
| 6,096,973 | * 8/2000 | Kluska et al. | 174/60 |

FOREIGN PATENT DOCUMENTS

| | | |
|---|---|---|
| A1 37 43 108 | 7/1989 | (DE) . |
| A1 37 43 632 | 7/1989 | (DE) . |
| A1 38 01 876 | 8/1989 | (DE) . |

* cited by examiner

Primary Examiner—Dean A. Reichard
Assistant Examiner—Dhiru R Patel
(74) Attorney, Agent, or Firm—Oliff & Berridge, PLC (57) ABSTRACT

A distributor including a plurality of connection points interconnected by jumpers. The distributor further includes: cable terminations each of which is provided with a plurality of connection strips, each strip being designed to receive one or more connector elements constituting the connection points; a central hub; and around the central hub, fixing means for individually connecting the cable terminations, where the cable terminations and the fixing means are organized so that the connections strips of each cable termination are disposed radially relative to the hub when the cable termination is put into place, and so that all of the jumpers can present substantially the same length and can pass from one connection point to another connection point by begin laid in part over the hub.

12 Claims, 9 Drawing Sheets

FIG.1

FIG_2

FIG_3

FIG_4

FIG_8

FIG_9

SPLITTER BOX

BACKGROUND OF THE INVENTION

The present invention relates to a distributor for an electrical or an optical network, and to a cable termination for mounting in such a distributor.

Distributors and sub-distributors are already known that are constituted by devices enabling transport cables to be connected to distribution cables for the purpose of connecting subscribers to a distribution network.

In such a distributor or in such a sub-distributor, the transport cables and the distribution cables terminate in cable terminations which are fixed to a frame.

Each cable termination supports connection points for jumpers which are individual conductors (optical or electrical) that provide the link between two connection points, one belonging to a transport cable termination and the other to a distribution cable termination.

In conventional distribution and sub-distributors, cable terminations are disposed in rows and columns and the jumpers need to be of various different lengths, thereby making the general organization of the distributor more complicated.

In addition, if it is desired to modify a connection between two connection points, it is not possible merely to displace one of the ends of a jumper, firstly because of the way in which the jumpers become tangled together, and secondly because the length of the newly-required jumper can be longer than the length of the jumper already in place.

OBJECTS AND SUMMARY OF THE INVENTION

The present invention seeks to resolve those problems by proposing a distributor of a novel type.

The present invention provides a distributor comprising a plurality of connection points interconnected by jumpers, the distributor being characterized by the fact that it comprises:

cable terminations each of which is provided with a plurality of connection strips, each strip being designed to receive one or more connector elements constituting the connection points;

a central husband around the central hub, fixing means for individually connecting the cable terminations, where the cable terminations and the fixing means are organized to that the connection strips of each cable termination are disposed radially relative to the hub when said cable termination is put into place, and so that all of the jumpers can present substantially the same length and can pass from one connection point to another connection point by being laid in part over the hub.

By means of the invention, all of the jumpers can be of the same length, thereby making it easier to displace one of their ends from one cable termination to another, since the maximum distance between two cable terminations passing via the hub is substantially equal to twice the distance between each cable termination and the hub.

In addition, because the jumpers are wound in part around the hub, they come into loose contact over a portion only of their width, thus making it easy for them to slide axially relative to one another, thereby making it easier to extract any jumper that has been taken out of use and also making it easier to install additional jumpers.

In the distributor of the invention, the number of cable terminations present can be just sufficient to establish all of the connections required, it being possible to add other cable terminations to the distributor subsequently.

In a particular embodiment of the invention, the cable terminations are externally in the shape of respective portions of a ring disposed concentrically around the hub, and defined between pairs of planes that intersect on the axis of the hub.

In other words, if the cable terminations occupy all of the free space around the hub, then they constitute a ring that is concentric about the hub.

Preferably, the distributor includes a ring around the hub and provided with fixings for securing the cable terminations.

In addition, a jumper protection disk can be provided at the end of the hub to protect the jumpers, and similarly concentric fins situated in the same plane as the protection disk and situated thereabout can be provided to protect the jumpers by holding them between radial partitions inside through channels connecting the vicinity of the hub to each of the cable terminations.

The present invention also provides a cable termination as described above, i.e. for mounting in a distributor to be connected to other cable terminations by jumpers, the cable termination being characterized by the facts that its outside shape is suitable for enabling it to be mounted around a central hub provided in the distributor, and that it is provided with a plurality of connection strips disposed radially relative to the hub when the cable termination is in place, each connection strip being designed to receive one or more connector elements constituting connection points for the jumpers, the outside shape of the cable termination in a particular embodiment being that of a portion of a ring that is concentric with the hub, and that is defined between two planes that intersect on the axis of the hub.

In a particular embodiment of the invention, each connection strip is mounted to pivot individually on its cable termination between a retracted position in which its connection points are presented in a plane perpendicular to the hub, and an extended position in which its connection points project from said plane.

In this embodiment, access to the connection points of a connection strip is made easier by the fact that the strip in question dan be extracted from the plane containing all of the connection points.

Preferably, the cable termination also includes an abutment that is tiltable between a retracted position and a working position in which it serves as a stop for a connection strip in the extended position.

In a particular embodiment, the cable termination includes a pivot pin enabling it to pivot while keeping its jumpers in the same angular sector as when said cable termination is in its normal, in-use position, thereby providing access to its rear face from the front of the distributor.

BRIEF DESCRIPTION OF THE DRAWINGS

In order to make the invention better understood, there follows a description of an embodiment given by way of non-limiting example with reference to the accompanying drawings, in which.

DETAILED DESCRIPTION OF PREFERRED EMBODIMENT

Figure 1:
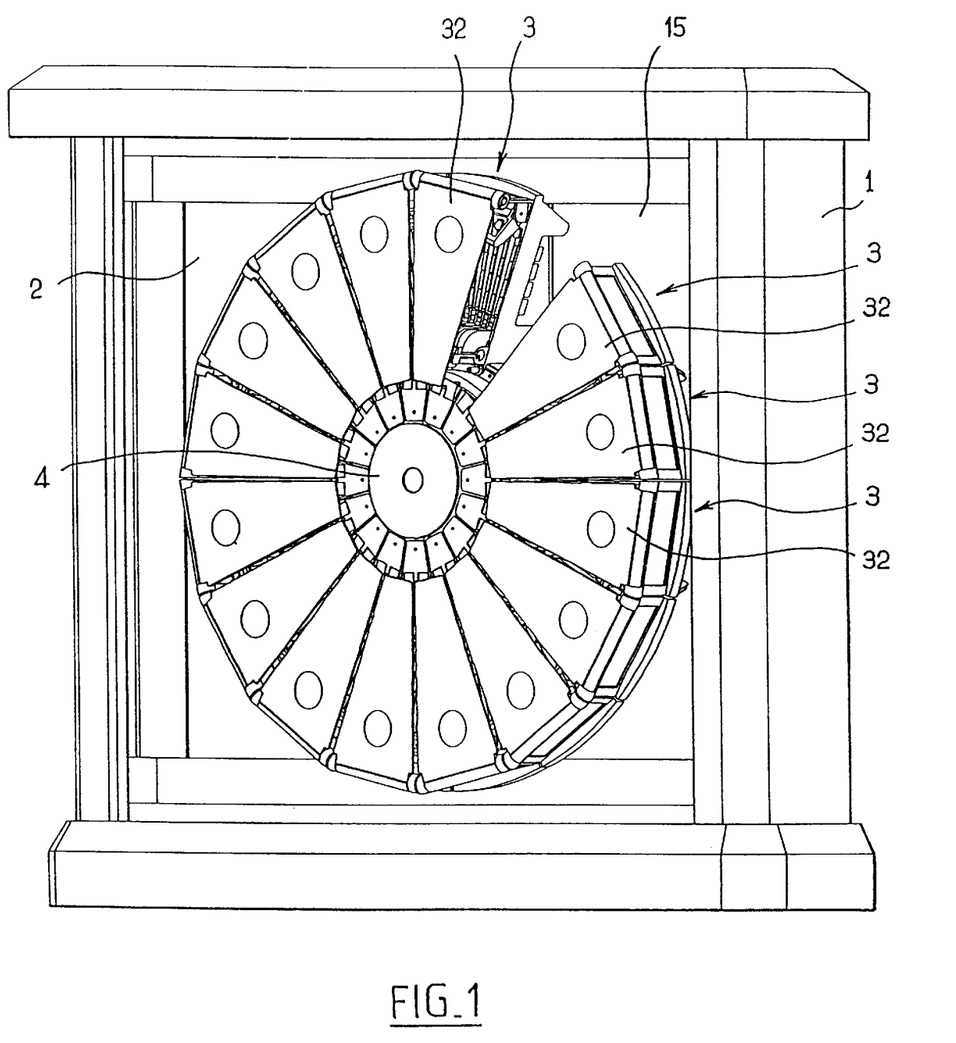
FIG. 1 is a perspective view of a sub-distributor.

In FIG. 1, a distribution cabinet 1 defines an inside volume 2 containing the various components of the distributor proper.

The distributor has fifteen cable terminations 3 that are uniformly distributed around a central support 4.

Figure 2:
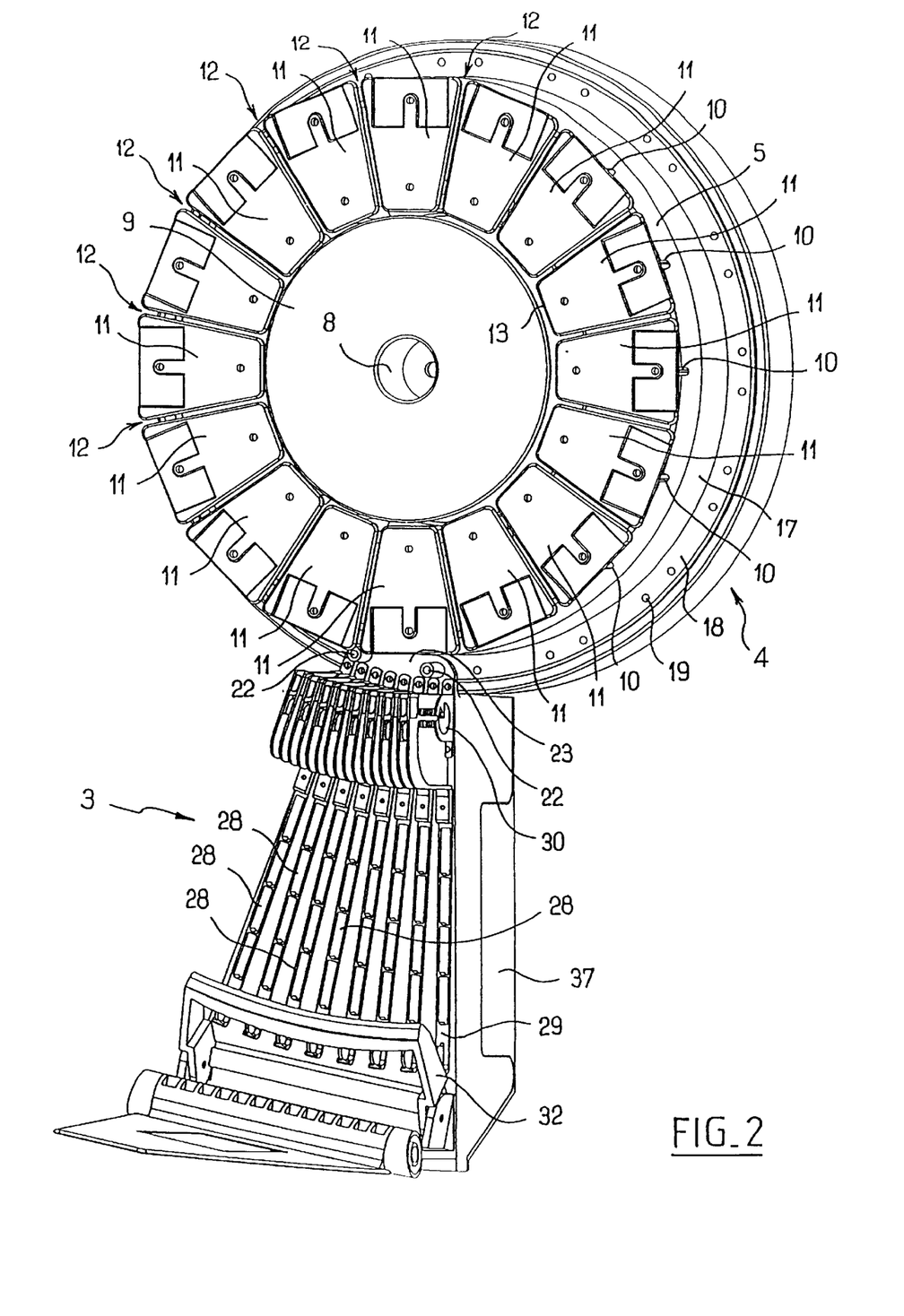
FIG. 2 is close-up view of the central support and of one cable termination of FIG. 1.
Figure 3:
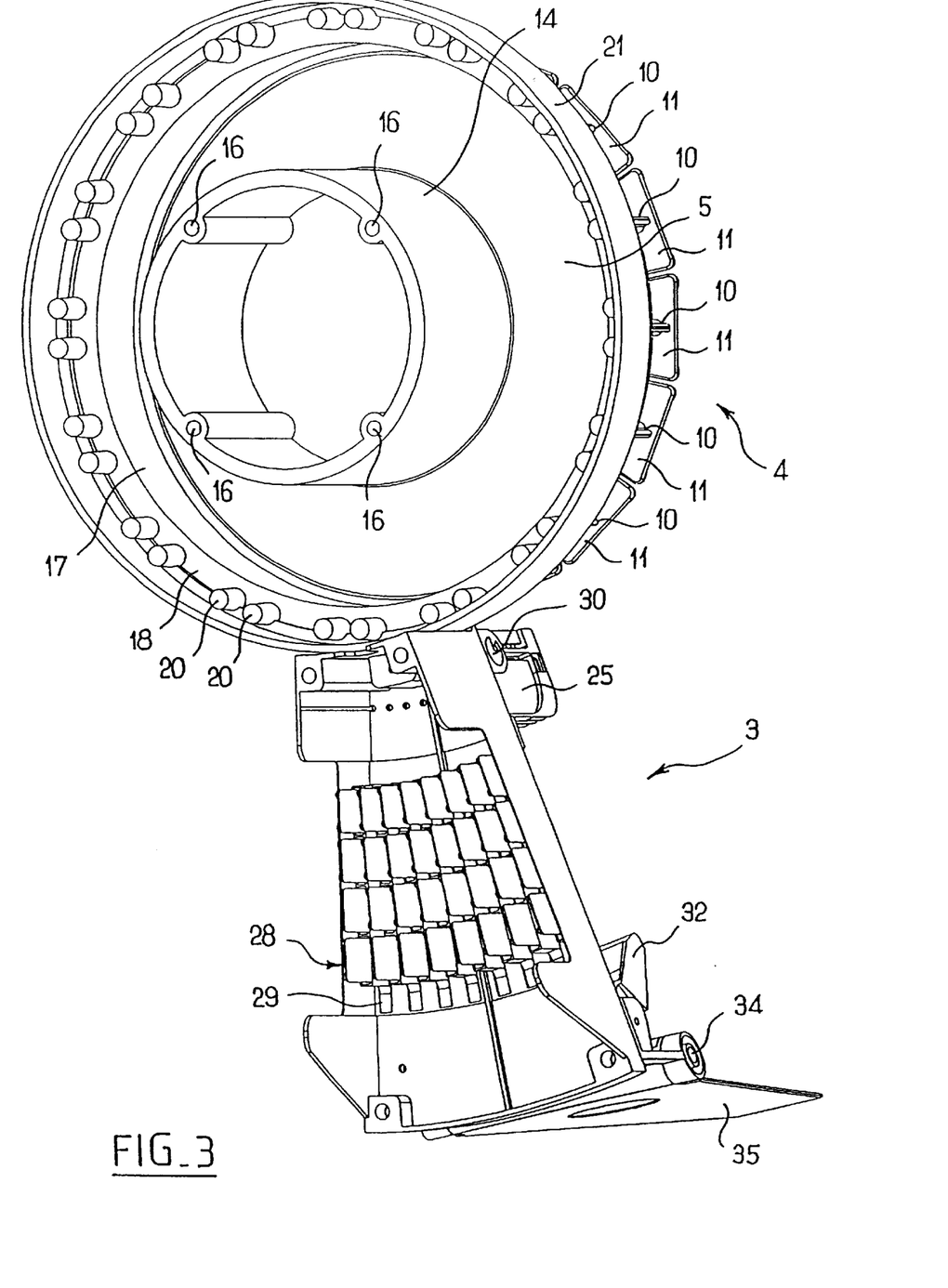
FIG. 3 is a back view of the parts shown in FIG. 2.
Figure 4:
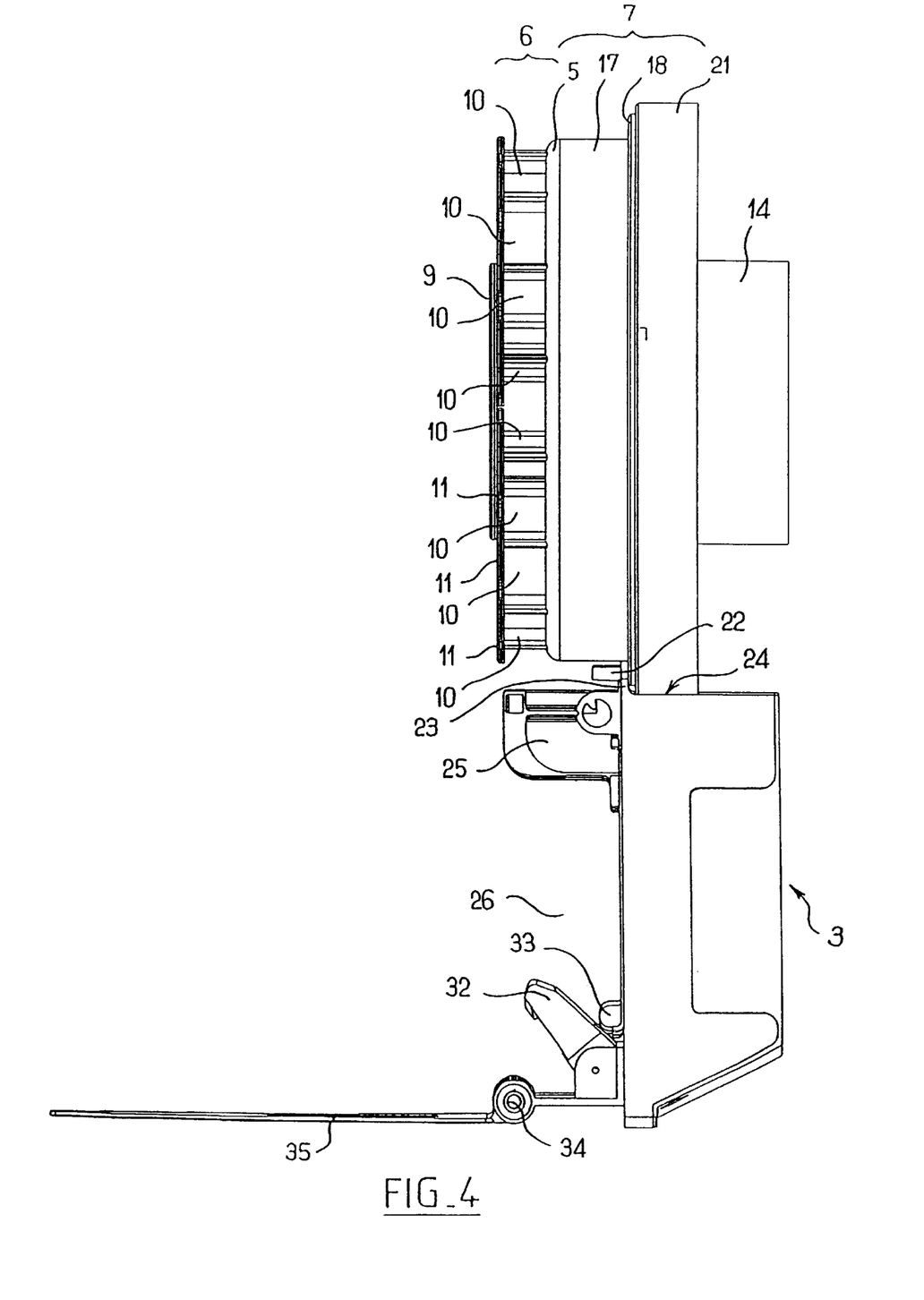
FIG. 4 is a side view of the parts shown in FIG. 2.

The central support 4 can be seen more clearly in FIGS. 2 to 4 and comprises initially a circular plate 5 which separates a front portion 6 from a rear portion 7 of the support.

The front portion has a central hub 8 projecting from the plate 5 and supporting a disk 9 at its front end.

The empty space left around the hub 8 between the plate 5 and the disk 9 allows jumpers interconnecting two cable terminations to be laid so as to wind part of the way around the hub (without necessarily coming into contact therewith).

Around the hub 8, the plate 5 supports a plurality of radial partitions 10 extending perpendicularly to said plate 5 and regularly distributed around said hub 8.

Each radial partition 10 supports a trapezoidally-shaped fin 11 whose small base is adjacent to the disk 9 and whose large base extends substantially to the vicinity of the plate 5.

The fins 11 are separated by radial slots 12 and form a discontinuous ring surrounding the disk 9 and lying in the same plane.

Two adjacent radial partitions 10 co-operate with the plate 5 and the fins 11 to define a through channel for jumpers between the space surrounding the hub 8 and the corresponding cable termination, with access to said space being provided by the slot 12.

A jumper can thus come from one cable termination, penetrate into a through channel, open out beneath the disk 9 in the space surrounding the hub, be laid round the hub, penetrate into another through passage, and reach another cable termination, while thus being protected from the outside over its entire path.

It will be observed that the substantially circular slot 13 which separates the disk 9 from the small bases of the fins 11 makes it possible while a jumper is being put into place, for it to be laid around the hub so as to bring it to the slot 12 of the desired through channel.

In the rear portion 7 of the support 4, i.e. the portion behind the plate 5, a circular wall 14 enables the support 4 to be mounted on the end wall 15 of the cabinet 1 by means of screws (not shown) passing through holes 16 provided for this purpose in the thickness of the wall 14.

The wall 14 projects projects the support 4 via a thickness that is sufficient to allow transport and distribution cables to pass and also to enable cable terminations to be put into place, as described below.

At its periphery, the plate 5 has a first cylindrical skirt 17 which extends rearwards to a ring 18 provided with fixings for securing the cable terminations.

These fixings comprise holes 19 formed in studs 20 integrally molded with the ring 18, the holes 19 being organized in pairs along the ring 18.

At the periphery of the ring 18, a second cylindrical skirt 21 extends towards the rear of the distributor over a thickness that is just enough to provide appropriate support to the cable terminations, as explained below.

Each cable termination 3 is mounted on the ring 18 of the support 4 by means of screws 22 engaged in pairs of holes 19.

For fixing purposes, each cable termination has a rim 23 through which the screws 22 pass, and a bearing surface 24 which bears against the second skirt 21 of the support.

Where necessary, additional bearing against the end wall 15 of the cabinet 1 can be provided behind the cable termination.

A wire guide 25 which serves to guide jumpers parallel to one another is provided on the cable termination in register with the through channel of the support.

The jumpers can thus leave a through channel while being grouped together parallel to one another in a plane that is substantially parallel to the plane of the wall 5.

Thereafter, the jumpers can be laid in an empty space 26 provided for this purpose downstream from the wire guide so as to be connected to connection points.

In the example shown, these connection points are constituted by optical or electrical connector elements 27 (shown in FIGS. 5, 6, and 7) inserted in sockets 28 in connection strips 29 housed in the cable termination When the cable termination is put into place, the connection strips 29 extend radially relative to the hub.

Figure 5:
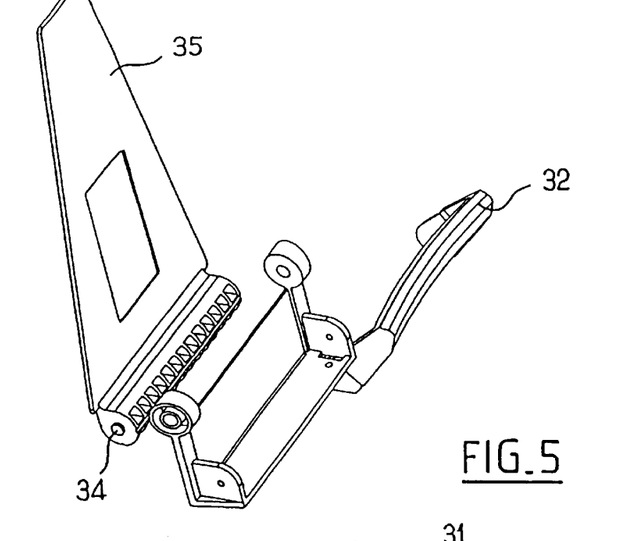
FIG. 5 is an exploded perspective view of a cable termination provided with connector elements on which jumpers are connected.
Figure 6:
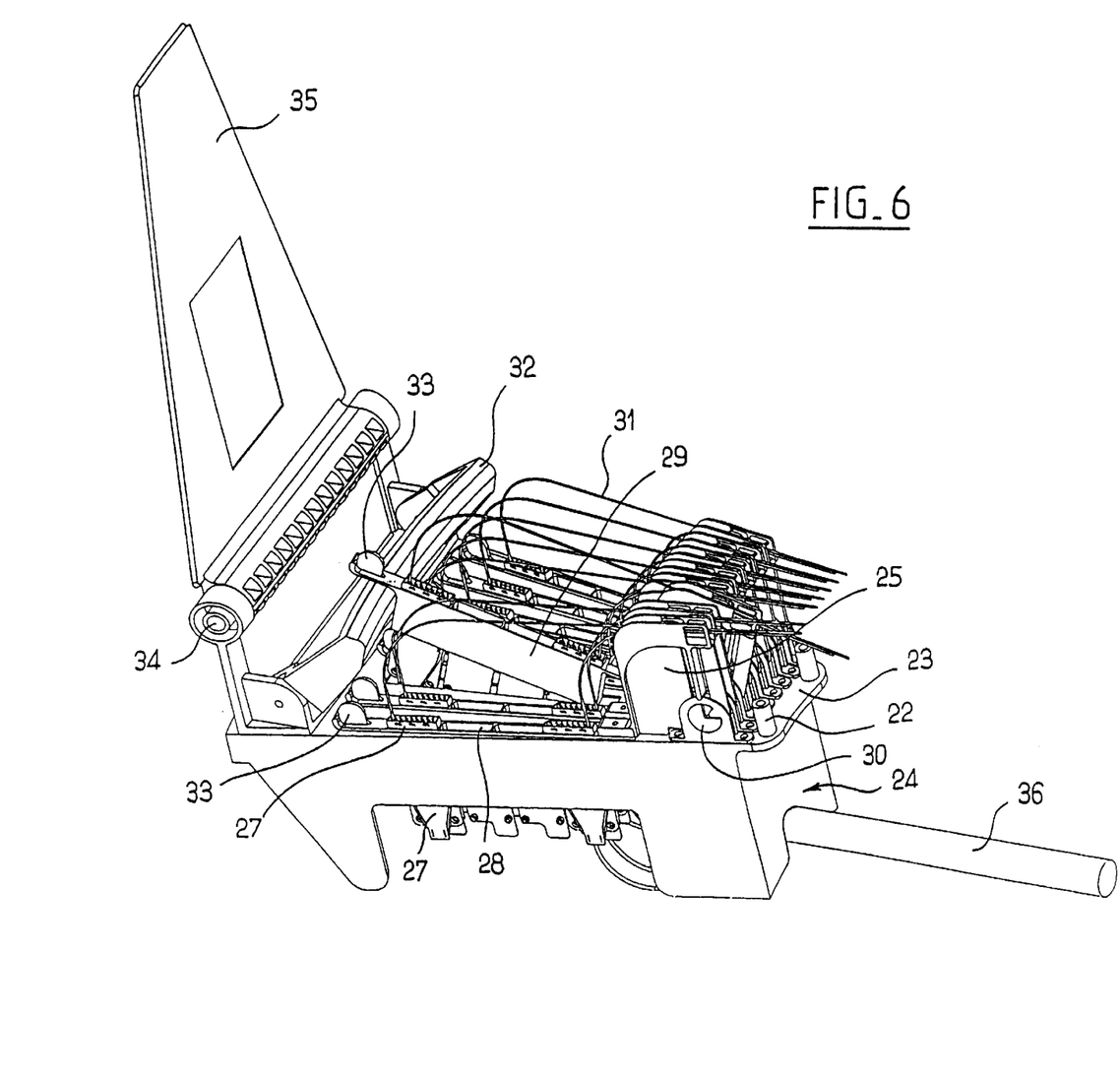
FIG. 6 is a perspective view of the same cable termination.
Figure 7:
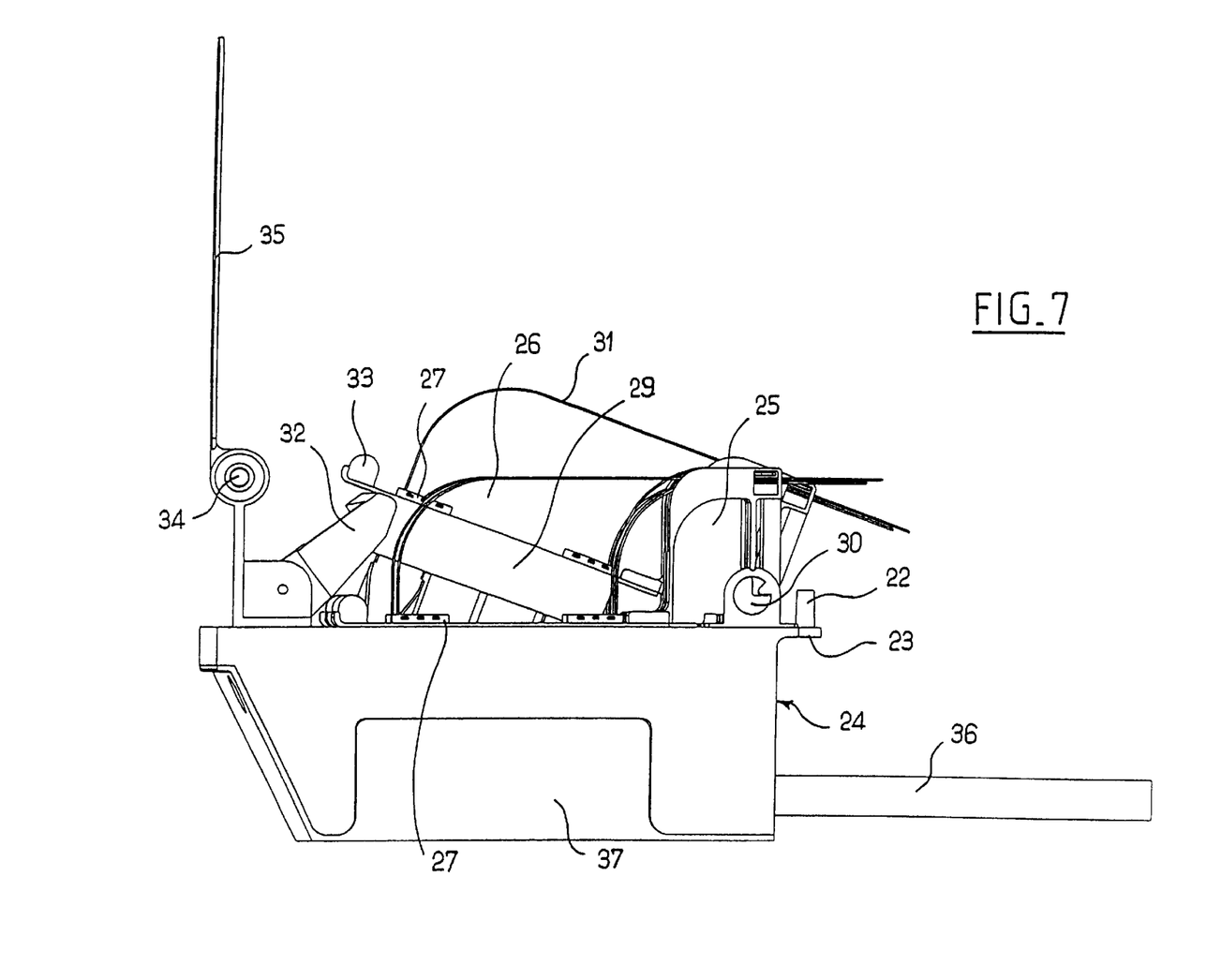
FIG. 7 is a side view of the cable termination

Thus, the cable termination is substantially in the form of a portion of a ring, being defined between two planes that intersect on the axis of the hub 8.

Each strip is mounted to be individually pivotable, together with the corresponding wire guide 25, about an axis 30 close to the ring 18, so as to pivot between a retracted position in which the connection points lie in the plane of the plate 5, and an extended position in which the connection points emerge from the sheet of jumpers 31 and project from said plane.

An abutment 32 is mounted to tilt between a vertically retracted position and an extended position, as shown in the drawing, in which it serves as a support for a connection strip 29 in its extended position.

A grip or tab 33 secured to the connection strip away from the pin 30 enables it to be pulled into its extended position.

The cable termination also includes, mounted on a pin 34 parallel to the pin 30, a pivoting cap 35 of trapezoidal shape which covers the jumpers to the vicinity of the through channel so as to protect the jumpers completely from the outside.

It will be understood that each cable termination can be mounted individually on the support 4 and that a distributor providing only a relatively small number of connections need have only a small number of cable terminations. In the example described, a maximum of sixteen cable termination can be installed so as to form a ring having 4096 connection points.

Like the jumpers 31 which are laid in part around the hub 8, the transport and distribution cables 36 reaching the distributor via the rear portion of the support 4 can also be laid around the wall 14.

The cable termination is closed on its face remote from the pivoting cap 35 by a rear cap 37.

Figure 8:
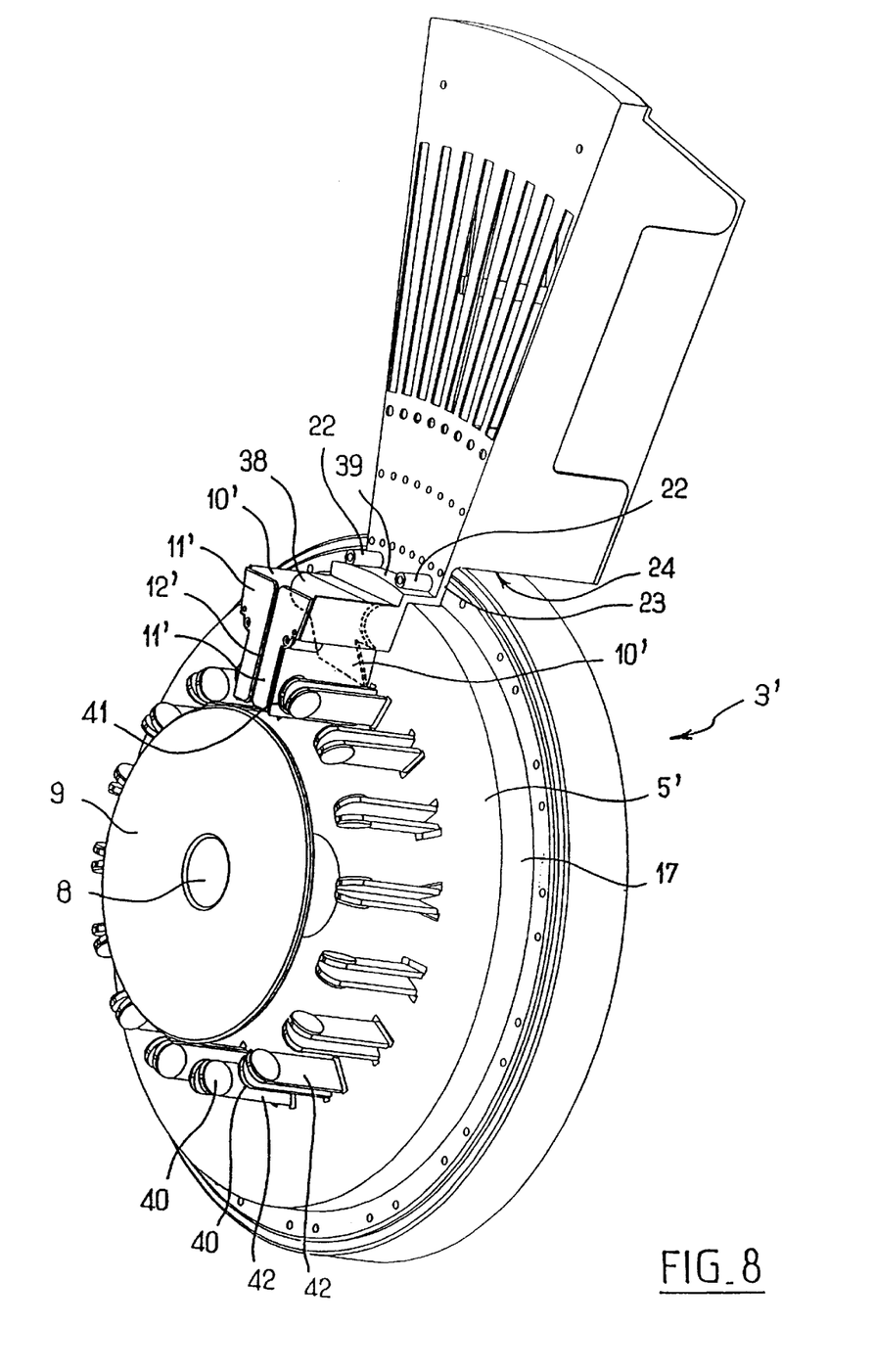
FIG. 8 is a perspective view of a variant of the central support and of the cable termination.
Figure 9:
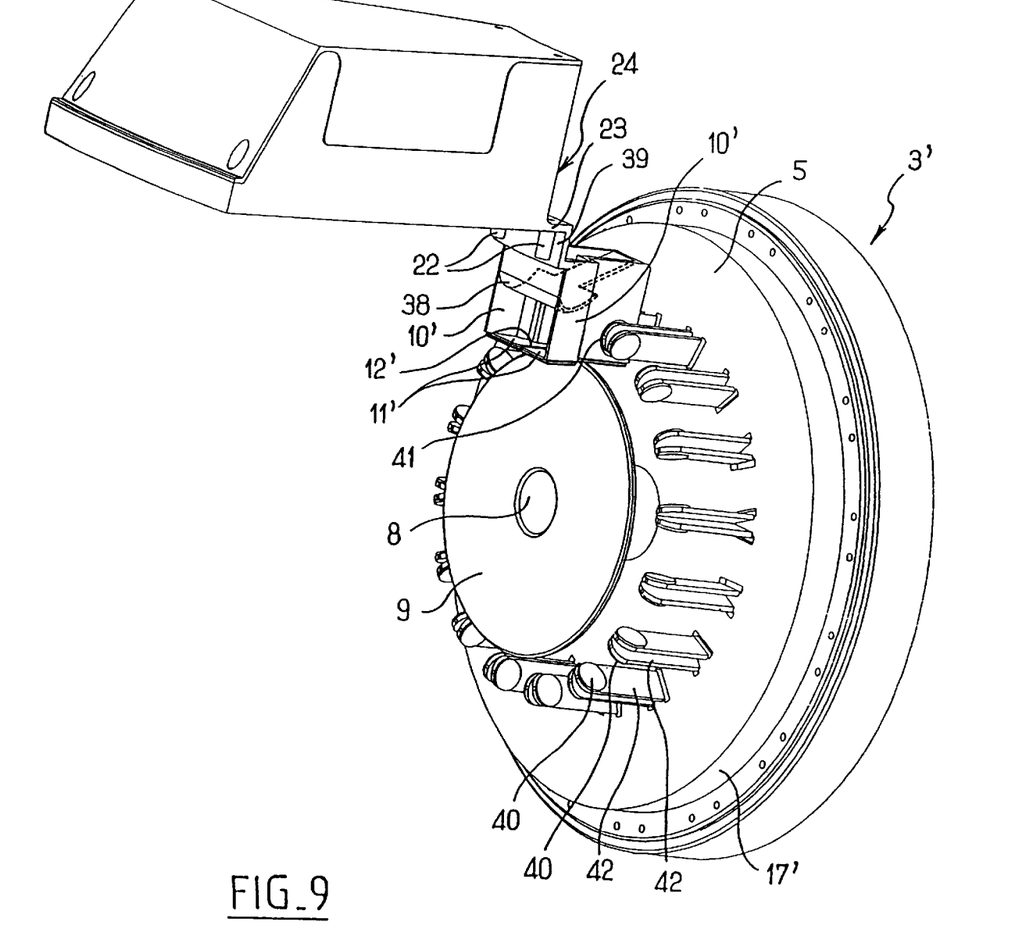
FIG. 9 is a view analogous to FIG. 8 after the cable termination has been pivoted.

In the variant of FIGS. 8 and 9, the cable termination 3' includes its own through channel forming an integral portion of the body of the cable termination.

Said through channel is thus constituted by an end wall 38 shaped to guide the jumpers to the top of the wire guide (not shown), two side partitions 10 perpendicular to the plate 5' and two fins 11' parallel to the plate 5' and separated by a radial slot 12'.

The end wall 38 is united with the edge 23 of the body of the cable termination by a wall 39 covering the first skirt 17' of the central support, which skirt is thinner than the embodiment of FIGS. 1 to 7.

The remainder of the body of the cable termination is identical to that described above (the wire guide and the connection strips supporting the connector elements are not shown in FIGS. 8 and 9).

In addition to the fixing screws 22 and the bearing surface 24, the cable termination is secured to the support by tenons 40 which engage in corresponding recesses 41 formed in the thickness of the side walls 10', in the vicinity of the fins 11'.

The tenons 40 are mounted on legs 42 extending perpendicular to the place 5' and presenting a small amount of elasticity enabling them to be spaced apart in pairs for insertion of the through channel of a cable termination.

The tenons 40 and the recesses 41 together define a pivot axis which enables the cable termination to pivot (after the screws 22 have been removed) in the manner shown in FIG. 9, while keeping the jumpers wound around the hub 8 and leaving the empty space around the hub via the same angular sector as when the cable termination is in its normal in-use position, i.e. in the position shown in FIG. 8.

Such pivoting gives access to the rear of the cable termination from the front of the central support under good conditions, and it does so without disturbing the connections. By way of example, this makes it possible to modify or to restore the connection between a conductor of a distribution cable or a transport cable and a connector element of a strip.

It should be observed that winding the transport cables and the distribution cables loosely around the wall 14 a the rear of the central support in the same manner a the jumpers are laid around the hub 8 makes it easier to pivot the cable terminations since the cables, like the jumpers, remain within the same angular sector after pivoting.

Naturally, the embodiments described above are not limiting in any way and can be subjected to any desirable modification without thereby going beyond the ambit of the invention.

What is claimed is:

1. The distributor comprising a plurality of connection points interconnected by jumpers, the distributor comprising:

cable terminations each of which is provided with a plurality of connection strips, each connection strip of said connection strips being designed to receive one or more connector elements constituting the connection points;

a central hub; and around the central hub, fixing means for individually connecting the cable terminations, where the cable terminations and the fixing means are organized so that the plurality of connection strips of each cable termination are disposed radially relative to the hub when each cable termination is put into place, and so that all of the jumpers can present substantially the same length and can pass from one said connection point to another of said connection points by being laid in part over the hub.

2. A distributor according to claim 1, wherein the cable terminations are externally in a shape of respective portions of a ring disposed concentrically around the hub, and defined between pairs of planes that intersect on the axis of the hub.

3. A distributor according to claim 1, including a ring around the hub and providing with fixings for securing the cable terminations.

4. A distributor according to claim 1, including a jumper protection disk at the end of the hub.

5. A distributor according to claim 4, including concentric fins around the jumper protection disk and substantially in the same plane as the jumper protection disk, which fins are separated from the jumper protection disk by a substantially circular slot and are separated from one another by radial slots, said fins co-operating with radial partitions to define through channels for the jumpers.

6. A distributor according to claim 1, wherein the fixing means implement pivot axes enabling each of said cable termination to pivot in such a manner that the jumpers connected to each cable termination remain, after pivoting, in a same angular sector of the central hub as when each cable termination is in its normal, in-use position, said pivoting giving access to the rear of each cable termination from the front of the distributor.

7. A cable termination for mounting in a distributor for connection to other cable terminations, by means of jumpers, the cable germination having an outside shape of the cable termination suitable for enabling it to be mounted around a central hub provided in the distributor, and that it is provided with a plurality of connection strips disposed radially relative to the hub when the cable termination is in place, each of said connection strips being designed to receive one or more connector elements constituting connection points for the jumpers.

8. A cable termination according to claim 7, wherein its outside shape constitutes a portion of a ring concentric with the hub, and extending between two planes that intersect on the axis of the hub.

9. A cable termination according to claim 7, wherein each connection strip of said connection strips is mounted to pivot individually on its cable termination between a retracted position in which its connection points are presented in a plane perpendicular to the hub, and an extended position in which its connection points project from said plane.

10. A cable termination according to claim 9, including a tilting abutment for holding each connection strip of said connection strips in its extended position.

11. A cable termination according to claim 7, including a pivot pin enabling it to pivot while keeping its jumpers in a same angular sector as when said cable termination is in its normal, in-use position, thereby providing access to its rear face from the front of the distributor.

12. A cable termination according to claim 11, including a through channel for the jumpers, the through channel being constituted in particular by radial partitions serving to embody the pivot pin.

* * * * *

UNITED STATES PATENT AND TRADEMARK OFFICE
CERTIFICATE OF CORRECTION

PATENT NO. : 6,284,972 B1
DATED : September 4, 2001
INVENTOR(S) : Michel L.R. Dillat et al.

Page 1 of 1

It is certified that error appears in the above-identified patent and that said Letters Patent is hereby corrected as shown below:

<u>Title page,</u>
Change the title at item [54] to read -- DISTRIBUTOR --.

Signed and Sealed this

Twenty-eighth Day of May, 2002

Attest:

JAMES E. ROGAN
Attesting Officer
Director of the United States Patent and Trademark Office